US009168871B2

(12) United States Patent
Soderlind et al.

(10) Patent No.: US 9,168,871 B2
(45) Date of Patent: Oct. 27, 2015

(54) REAR-VIEW MIRROR WITH MULTI-MODE DISPLAY SCREEN, SYSTEM COMPRISING SAME, AND METHOD OF USING SAME

(75) Inventors: Erik William Soderlind, Harrison Township, MI (US); David Michael Pedlow, Plymouth, MI (US); Roberto Ramirez, Commerce, MI (US)

(73) Assignee: Ford Global Technologies, Dearborn, MI (US)

( * ) Notice: Subject to any disclaimer, the term of this patent is extended or adjusted under 35 U.S.C. 154(b) by 425 days.

(21) Appl. No.: 13/283,848

(22) Filed: Oct. 28, 2011

(65) Prior Publication Data

US 2013/0107045 A1    May 2, 2013

(51) Int. Cl.
| | |
|---|---|
| B60R 1/00 | (2006.01) |
| B60R 1/04 | (2006.01) |
| B60R 1/12 | (2006.01) |

(52) U.S. Cl.
CPC ............ B60R 1/04 (2013.01); *B60R 2001/1253* (2013.01)

(58) Field of Classification Search
CPC .... B60R 1/00; B60R 2300/105; B60R 11/04; B60R 2300/802; H04N 7/181
USPC ........................................................ 348/148
See application file for complete search history.

(56) References Cited

U.S. PATENT DOCUMENTS

| | | | |
|---|---|---|---|
| 7,224,324 B2 | 5/2007 | Quist et al. | |
| 7,583,184 B2 * | 9/2009 | Schofield et al. | 340/438 |
| 7,855,755 B2 * | 12/2010 | Weller et al. | 349/11 |
| 7,881,496 B2 | 2/2011 | Camilleri et al. | |
| 8,063,753 B2 * | 11/2011 | Deline et al. | 340/425.5 |
| 8,083,386 B2 * | 12/2011 | Lynam | 362/494 |
| 2006/0147264 A1 * | 7/2006 | Doran | 404/73 |
| 2008/0225538 A1 * | 9/2008 | Lynam et al. | 362/494 |
| 2012/0086808 A1 * | 4/2012 | Lynam et al. | 348/148 |

* cited by examiner

*Primary Examiner* — Jay Patel
*Assistant Examiner* — Frank Huang
(74) *Attorney, Agent, or Firm* — Angela M. Brunetti; Raymond Coppiellie

(57) ABSTRACT

An image display system comprises a camera presence detector for detecting presence of a rear-view camera mounted on a towed unit connected to a towing vehicle, an image display format controller coupled to the camera presence detector, and a rear-view mirror assembly including an image display apparatus. The image display format controller enables a first display mode when the camera presence detector detects the towed unit rear-view camera and enables a second display mode when the camera presence detector fails to detect presence of the towed unit rear-view camera. An image output device of the image display apparatus underlies a central portion of an image display apparatus viewing substrate at a rear surface thereof. An image outputted is viewable through the central portion when the first display mode is implemented. The central portion can provide reflected rear-view imaging utility when the second display mode is implemented.

13 Claims, 2 Drawing Sheets

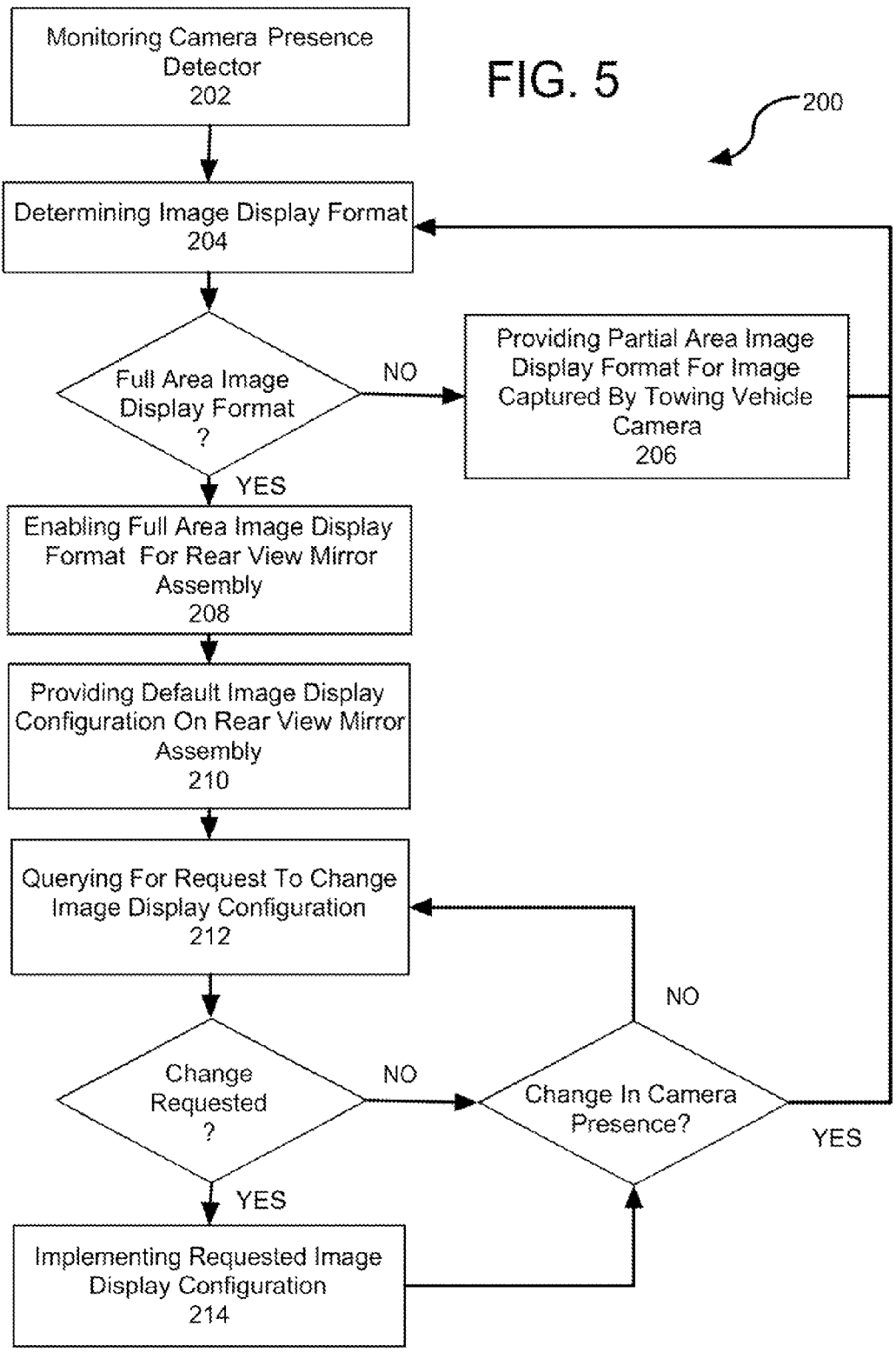

REAR-VIEW MIRROR WITH MULTI-MODE DISPLAY SCREEN, SYSTEM COMPRISING SAME, AND METHOD OF USING SAME

FIELD OF THE DISCLOSURE

The disclosures made herein relate generally to rear-view camera features for towing vehicles and, more particularly, to a rear-view mirror with a multi-mode display screen that enables display screen size dependent upon detecting presence of a camera of a towed unit.

BACKGROUND

Vehicles are often used for towing trailers carrying various types of cargo and are, thus, referred to herein as towing vehicles. Examples of such trailers include, but are not limited to, travel trailers, snowmobile trailers, boat trailers, horse trailers, car trailers, and the like. In many cases, the height of a trailer being pulled by a towing vehicle results in a driver of the towing vehicle seeing only the trailer when looking into the towing vehicle's rear-view mirror. As such, the driver has limited to zero visibility of an area behind the trailer, which adversely impacts the driver's ability to pull and back-up the trailer in a safe and convenient manner. In the context of the disclosures made herein, trailers and motor vehicles being pulled by a towing vehicle are examples of towed units (i.e., a wheeled structure being towed by a vehicle). Similarly, vehicles are often towed (i.e., can be towed units) and present similar adverse issues to towing a trailer.

Integration of a rear-view camera into vehicles that are often used as towing vehicles is well known. For example, pick-up trucks often include a rear-view camera mounted on a tailgate, bumper, or other rear-most portion thereof for the purpose of viewing an area behind the truck, viewing a trailer hitch connection while towing a trailer, and/or viewing a trailer while towing it. However, when a trailer is connected to such a towing vehicle, a field of view of the camera can be severely limited in that the trailer can occupy a significant portion of the camera's field of view. As such, a towing vehicle mounted rear-view camera typically offers limited visibility behind a trailer being towed by the towing vehicle.

Various types of aftermarket (i.e., user-installed accessory item) back-up camera systems are commercially available from companies such as, for example, Master Lock Company and Weldex Corporation. These aftermarket back-up camera systems include a visual display apparatus and a camera that wirelessly transmits images (e.g., a streaming video image) to the visual display apparatus, thereby allowing the images from the camera to be displayed on the visual display apparatus. Providing that a particular aftermarket back-up camera system has an adequate transmit range between the visual display apparatus and the camera, the camera of such a system can be mounted on the rear portion of a trailer being towed by a towing vehicle and the visual display apparatus can be mounted in the cabin at a position viewable by the driver. While this utilization of such a back-up camera system does provide for visibility behind the trailer, it is not without shortcomings. One such shortcoming is that the visual display apparatus is precluded from being mounted at a location that the driver is most used to looking at for gaining information about the area behind the vehicle, which is the rear-view mirror. Another such shortcoming is that available mounting locations for the visual display apparatus can adversely affect visibility through the windshield when mounted on a top surface of the dashboard (e.g., below the rear-view mirror, behind the steering wheel, to the left of the steering wheel, etc), can take the driver's attention away the road forward of the vehicle when mounted on a rear-facing surface of the dashboard or on the center console, and/or can interfere with operation/access to other controls/features of the towing vehicle when mounted on a rear-facing surface of the dashboard over/adjacent to controls/climate control vents.

Therefore, an image display system with a multi-mode display screen that enables display screen size dependent upon presence of a rear-view camera mounted on a towed unit, that displays images provided by the rear-view camera mounted on the towed unit, and that overcomes shortcomings with utilizing aftermarket back-up camera systems to provided related functionality would be advantageous, desirable, and useful.

SUMMARY OF THE DISCLOSURE

Embodiments of the present invention are directed solving the problem of impaired visibility behind a towing vehicle when towing a towed unit (e.g., a trailer, a motor vehicle, etc) whose height and/or cargo precludes conventional use (i.e., reflected rear-view imaging) of a rear-view mirror and/or rear-view camera of the towing vehicle. More specifically, embodiments of the present invention are directed to a rear-view mirror with a multi-mode display screen for displaying images provided by a rear-view camera mounted on the towed unit. In the context of the disclosures provided herein, an image is defined herein to include a still image, a video image (continuously streaming or otherwise), and the like. The rear-view mirror enables default and selectable display screen size dependent upon camera presence such that an entire viewing surface of the rear-view mirror can be used to display images from one or more rear-view cameras when presence of a towed unit (e.g., a trailer, a motor vehicle, etc) mounted camera attached to the towing vehicle is detected. In this regard, embodiments of the present invention advantageously overcomes one or more shortcomings associated with impaired visibility behind a towing vehicle when towing a towed unit whose height and/or cargo precludes conventional use of a rear-view mirror and/or rear-view camera of the towing vehicle.

In one embodiment of the present invention, an image display system for a vehicle comprises a camera presence detector for detecting presence of a rear-view camera mounted on a towed unit connected to a towing vehicle, an image display format controller coupled to the camera presence detector, and an image display apparatus coupled to the image display format controller. The image display format controller enables a first display mode when the camera presence detector detects that the towed unit has a rear-view camera mounted thereon and enables a second display mode when the camera presence detector fails to detect that the towed unit has a rear-view camera mounted thereon. The image display apparatus includes a viewing substrate having a front surface and a rear surface and an image output device underlying a central portion of the viewing substrate at the rear surface thereof. An image outputted by the image output device is viewable through the central portion of the viewing substrate when the image display format controller causes the image display apparatus to be in the first display mode.

In another embodiment of the present invention, a method comprises an operation for monitoring a camera detection signal interface for detecting presence of a rear-view camera mounted on a towed unit connected to a towing vehicle. An operation is performed for enabling an image output device of an image display apparatus of the towing vehicle to output over a maximum image output area of an image output surface thereof an image captured by the towed unit rear-view camera coupled to the image output device in response to detecting that the towed unit rear-view camera is present and that the image provided by the towed unit rear-view camera is selected for being displayed. The image output device underlies a central portion of a rear surface of a viewing substrate of the image display apparatus. The maximum image output area of the image output surface defines perimeter edges of the central portion of the viewing substrate. The viewing substrate is configured for enabling the image captured by the towed unit rear-view camera to be viewable therethrough while the image is being outputted by the image output device.

In another embodiment of the present invention, a vehicle to which a towed unit can be towably attached comprises a vehicle wiring harness, a wiring harness coupling, and an image display apparatus. The wiring harness coupling is coupled to the vehicle wiring harness for enabling a wiring harness of the towed unit to be electrically connected to the vehicle wiring harness. The vehicle wiring harness is coupled to a towed unit camera interface of the wiring harness coupling thereby allowing an image signal generated by a camera mounted on the towed unit and connected to the towed unit wiring harness to be transmitted through the vehicle wiring harness. The image display apparatus is coupled to the vehicle wiring harness for enabling the towed unit camera image signal to be provided from the towed unit mounted camera to the image display apparatus. The image display apparatus includes an image output device underlying a central portion of a viewing substrate of the rear-view mirror at a rear surface thereof. A maximum image output area of the image output surface defines perimeter edges of the central portion of the viewing substrate. The viewing substrate and the image output device are jointly configured for enabling an image outputted on the image output surface to be viewable through the viewing substrate. An image corresponding to the towed unit camera image signal can be commanded to be outputted over the maximum image output area of the image output surface when the towed unit wiring harness is connected to the vehicle wiring harness.

These and other objects, embodiments, advantages and/or distinctions of the present invention will become readily apparent upon further review of the following specification, associated drawings and appended claims.

BRIEF DESCRIPTION OF THE DRAWINGS

FIG. 5 is a flow diagram showing a method for providing camera presence dependent image display functionality in accordance with an embodiment of the present invention.

DETAILED DESCRIPTION OF THE DRAWING FIGURES

Figure 1:
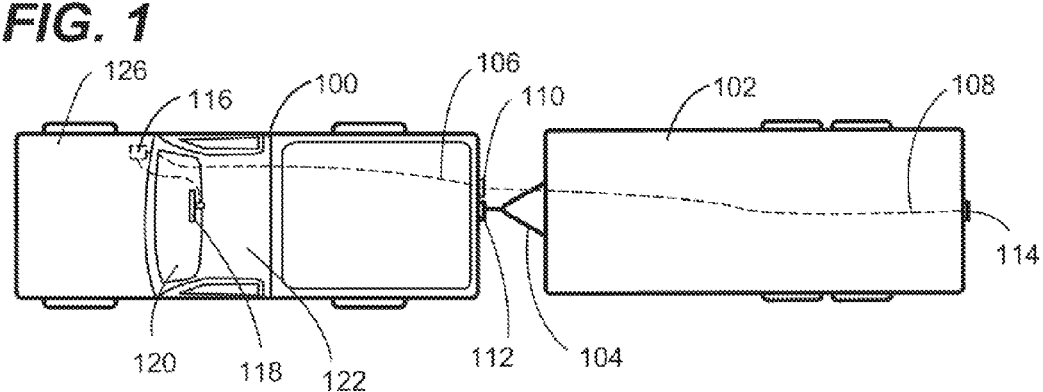
FIG. 1 is an illustrative view showing a towing vehicle and towed unit jointly providing an image display system configured in accordance with an embodiment the present invention.

FIG. 1 shows a towing vehicle 100 and a trailer 102 (i.e., a towed unit) configured in accordance with an embodiment of the present invention. The trailer 102 is towably coupled to the towing vehicle 100 through a trailer hitching apparatus 104. A wiring harness 108 of the trailer vehicle 100 is coupled to a wiring harness 106 of the towing vehicle 100 through a wiring harness coupling 110. The wiring harness coupling 110 is engaged by a mating connector of the trailer wiring harness for forming an electrical connection between the trailer wiring harness 108 and the towing vehicle wiring harness 106.

A towing vehicle rear-view camera 112 is mounted on the towing vehicle 100 and is electrically connected to the towing vehicle wiring harness 106. A trailer rear-view camera 114 is mounted on the trailer 102 and is electrically connected to the trailer wiring harness 108. Accordingly, the trailer rear-view camera 114 is coupled to the towing vehicle wiring harness 106 through the trailer wiring harness 108 and the wiring harness coupling 110. Preferably, but not necessarily, the towing vehicle rear-view camera 112 is mounted on a rear portion of the towing vehicle 100 (e.g., on a tailgate thereof) and the trailer rear-view camera 114 is mounted on a rear portion of the trailer 102 (e.g., on a rear wall thereof).

An electronic control unit (ECU) 116 is coupled between the towing vehicle wiring harness 106 and an image display device of a rear-view mirror assembly 118. The rear-view mirror assembly 118 is mounted within a passenger cabin 122 adjacent to a windshield 120. As shown, the ECU 116 is located within the passenger cabin 122. However, it is disclosed herein that the ECU 116 can be located in any number of locations, including, but not limited to, an engine compartment 126 or within the rear-view mirror assembly 118.

Advantageously, the rear-view mirror assembly 118 is configured to selectively provide reflected rear-view imaging utility, displayed camera image utility, or both simultaneously. Reflected rear-view imaging utility refers to the well-known functionality where an image created by reflective light is visible from a front surface 138 of a viewing substrate 130 (e.g., glass, multi-layer transparent substrate, etc) of the rear-view mirror assembly 118. Displayed camera image utility refers to an image captured by a camera being outputted on an image output device underlying the viewing substrate of the rear-view mirror assembly 118 and being viewable through the viewing substrate. In this regard, the viewing substrate is configured to provide reflected rear-view imaging utility at its portions where an underlying portion of the image output device is not active (i.e., is not outputting an camera captured image) and to provide displayed camera image utility at its portions where an underlying portion of the image output device is active (i.e., is outputting an camera captured image). In this regard, a first portion of the rear-view mirror can be providing reflected rear-view imaging utility whereas another portion can be simultaneously providing displayed camera image utility.

Figure 2:
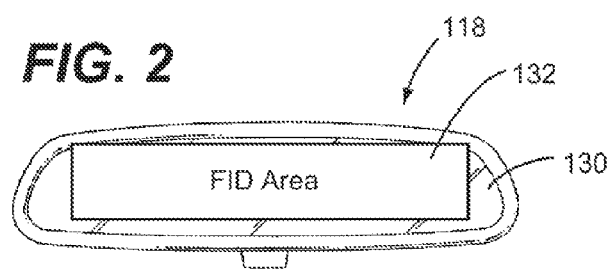
FIG. 2 is a front view of a rear-view mirror assembly configured for providing camera presence dependent image display functionality in accordance with an embodiment of the present invention and shown displaying a camera-captured image in a full area image display format.

Referring to FIG. 2, the rear-view mirror assembly 118 can be configured to provide for camera presence detection, display mode control, and full area image display format of an image captured by a camera. Full area image display (FID) format refers to an image captured by a camera being displayed over an entire area (FID area) of a central portion 132 of the viewing substrate 130. In the case where a towing vehicle is pulling a trailer (or other form of towed unit), the trailer can inhibit the rear-view mirror from allowing the driver of the towing vehicle to view all of a portion of a road scene behind the trailer that could otherwise be viewed using reflected rear-view imaging utility of the rear-view mirror assembly. Advantageously, the rear-view mirror assembly 118 is configured to allow an image captured by a rear-view camera attached trailer to be displayed over the entire area of the central portion 132 of the viewing substrate 130. In this regard, such image display utility can replace the reflected rear-view imaging utility while the trailer is connected to the towing vehicle. When the trailer is detached and/or when image display utility of the rear-view mirror assembly 118 is inactive, the rear-view mirror assembly 118 provides for reflected rear-view imaging utility and/optionally, partial area image display (PID) format of an image captured by a camera attached to the towing vehicle. Partial area image display format refers to an image captured by a camera being displayed over less than an entire area (PID area) of the central portion 132 of the viewing substrate 130 (e.g., adjacent to a side edge border 135 of the central portion 132).

Figure 3:
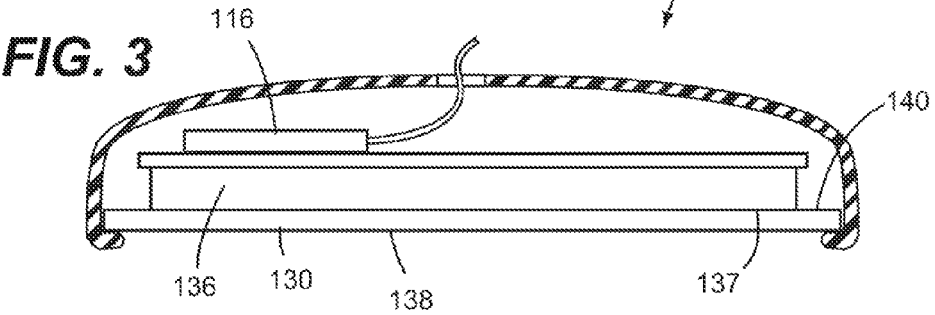
FIG. 3 is a cross sectional view showing operational components of the rear view mirror assembly of FIG. 2.

Referring now to FIG. 3, the ECU 116 of FIG. 1 is shown as being integral with the rear view mirror assembly 118 of FIG. 1 whereby the ECU 116 is coupled to an image display device 136 of the rear view mirror assembly 118 such as through a printed circuit board or other suitable type of circuitry. The ECU 116 is configured for detecting presence of the trailer rear-view camera 114 (i.e., serves as a camera presence detector), for enabling various image display modes (e.g., serves as an image display format controller), and for controlling image display on a image output surface 137 of the image display device 136 (i.e., serves as an image display controller). Thus, the rear view mirror assembly 118 is an example of an image display system configured in accordance with an embodiment of the present invention. In providing image display format controller functionality, the ECU 116 enables a first display mode when a trailer rear-view camera 114 is detected and enables a second display mode when the trailer rear-view camera is not detected (e.g., when the trailer is not connected to the towing vehicle 100). In a preferred embodiment of the present invention, coupling of the trailer wiring harness 108 to the vehicle wiring harness 106 via the wiring harness coupling 110 (FIG. 1) provides for detection of the trailer rear-view camera 114 by the ECU 116 (e.g., a camera image signal provided over the vehicle wiring harness 106 and the trailer wiring harness 108 are serves as a camera detection signal). In response to the trailer rear-view camera being detected by the ECU 116, the ECU 116 enables an image captured by the trailer rear-view camera to be displayed on the image output surface 137 of the image display device 136 over an area thereof that defines boarders of the central portion 132 of the viewing substrate 130, thereby providing for full area image display format of the image captured by the trailer rear-view camera 114.

Figure 4:
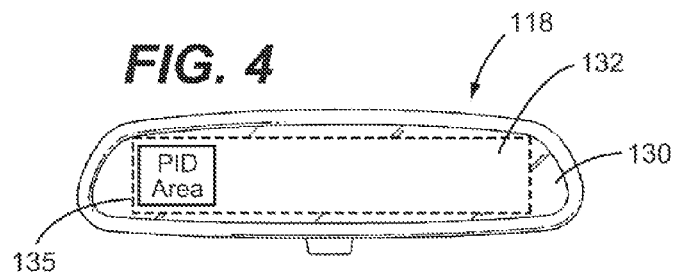
FIG. 4 is a front view of the rear-view mirror assembly shown in FIG. 2 showing a camera-captured image displayed in a partial area image display format.

The viewing substrate 130, which is part of the image display apparatus 136, has a front surface 138 and a rear surface 140. The image output device 136 underlies the central portion of the viewing substrate 130 at its rear surface 140. The viewing substrate 130 and the image output device 136 are jointly configured such that an image outputted by the image output device 136 is viewable through the central portion 132 of the viewing substrate 130. A maximum image output area of the image output surface 137 defines perimeter edges of the central portion 132 of the viewing substrate 130. When the trailer rear-view camera 114 is detected by the ECU 116, the image output device 136 outputs (or enables to output) over the maximum image output area of the image output surface 137 the image corresponding to a signal captured provided by the trailer rear-view camera 114. Accordingly, when the image outputted by the image output device 136 is outputted over the maximum display area of the image output surface 137, the image is displayed over an entire area of the central portion 132 of the viewing substrate 130. When selected, an image captured by the towing vehicle camera 112 can be outputted over the maximum display area of the image output surface 137, thereby allowing the image captured by the towing vehicle camera 112 to be displayed over an entire area of the central portion 132 of the viewing substrate 130. When the trailer rear-view camera is not detected, display of the image captured by the towing vehicle camera 112 is preferably limited to being displayed over a partial area of the central portion 132 of the viewing substrate 130 (as shown in FIG. 4). In view of the disclosures made herein, a skilled person will appreciate that the ECU 116 and the image display apparatus 136 are jointly configured for providing camera presence dependent image display functionality in accordance with an embodiment of the present invention. U.S. Pat. No. 7,855,755, which discloses a rear-view mirror assembly configured to simultaneously provide reflected rear-view imaging utility and partial area image display utility, is incorporated herein in its entirety by reference. However, it is disclosed herein that embodiments of the present invention are not unnecessarily limited to any particular technique or technology for providing reflected rear-view imaging utility and displayed camera image utility.

In view of the disclosures made herein, a skilled person will appreciate that all or a portion of the functionality provides by the ECU 116 can be provide by two or more discrete control modules (e.g., at the rear-view mirror assembly 118 or elsewhere in on the vehicle 100) and that all or a portion of the functionality provides by the ECU 116 can be provided by one or more control modules of a different vehicle control system (e.g., of a navigation control unit). In this regard, it is disclosed herein camera presence detector functionality, image display format controller functionality, and image display controller functionality are not unnecessarily limited to be in provided by any particular one or more control modules, controllers, and/or computers of a vehicle. Thus, an image display system configured in accordance with the present invention can be suitably offered in a variety of implementations such as an original equipment manufacturer feature (e.g., integrated into existing components of a vehicle), as a dealer-added accessory item (e.g., additional of a suitable rear view mirror assembly and/or control logic in one or more existing control modules, controllers, and/or computers), and/or as an aftermarket product (e.g., camera presence detector functionality, image display format controller functionality, and image display controller functionality all integrated into a replacement rear-view mirror assembly).

FIG. 5 shows a method 200 for providing camera presence dependent image display functionality in accordance with an embodiment of the present invention. An operation 202 is performed for monitoring a camera presence detector for determining when a towed unit (e.g., trailer, towed vehicle, etc) rear-view camera is present. In a preferred embodiment, detection of the towed vehicle rear-view camera corresponds to such a signal corresponding to an image captured by the towed unit rear view camera being received by a control module providing for at least one of display mode control and image display control of an image display system (e.g., when a towed unit wiring harness is coupled to a towing vehicle wiring harness). Furthermore, the operation 202 for monitoring the camera presence detector is performed repeatedly or continuously during an instance of the method 200.

In conjunction with monitoring the camera presence detector, an operation 204 is performed for determining an image display format for an image display system configured in accordance with an embodiment of the present invention. When a towed unit rear-view camera is not detected, full area image display format in accordance with the present invention is not implemented. Thus, an operation 206 for providing partial area image display for a towing vehicle rear-view camera (or other camera of the towing vehicle) is performed with the method 200 thereafter continuing at the operation for determining the current image display format for the image display system. Otherwise, when a towed unit rear-view camera is detected, an operation 208 is performed for enabling such full area image display format for the rear view mirror of the towing vehicle. In response to enabling such full area image display format for the rear-view mirror, an operation 210 for providing default image display on the rear-view assembly. In one example, providing the default image display includes causing such captured image to be continuously displayed in full area image display format unless another image display configuration is selected (e.g., via a selector of the rear view mirror assembly, a selector on a steering wheel of the towing vehicle, etc). In another example, providing the default image display includes causing such captured image to be continuously displayed in partial area image display format and only changing to full area image display format when such change is requested (e.g., selected). In yet example, providing the default image display includes providing reflected rear-view imaging utility until display of such captured image in full area image display format is requested (e.g., selected such as after notification is provided that such image display format has been enabled).

In response to providing the default image display, an operation 212 is provided for querying for a request to change a present image display configuration. For example, if a current image display configuration (e.g., that associated with the default image display configuration) entails providing full area image display of the image captured by the towed vehicle rear-view camera, a request could be requested for providing reflected rear-view imaging utility as opposed to display of any camera-captured image, a request could be made for providing full area image display of an image captured by the towing vehicle rear view camera, or a request could be made for switching image output of a selected camera to be in partial area image display format as opposed to full area image display format. It is disclosed herein that such querying can be in any number of different forms such as, for example, monitoring one or more selectors for manual input, implementing a notification to which a corresponding response serves as the change request, etc.

If such a change request is requested, an operation 214 is performed for implementing the requested change in the image display configuration. Otherwise, no change to the image display configuration is implemented. Thereafter, if a change in camera presence is detected (i.e., the towed vehicle rear-view camera is no longer detected), the method continues at the operation 204 for determining the current image display format for the image display system. Otherwise, the method continues with the operation 212 for querying for a request to change the present image display configuration.

Referring now to instructions processible by a data processing device, it will be understood from the disclosures made herein that methods, processes and/or operations adapted for carrying out camera presence dependent image display functionality in accordance with an embodiment of the present invention as disclosed herein are tangibly embodied by computer readable medium having instructions thereon that are configured for carrying out such functionality. In one specific embodiment, the instructions are tangibly embodied for carrying out the method 200 disclosed above. In another specific embodiment, the instructions are tangibly embodied for carrying out the functionality discussed in reference to the image display system of FIGS. 1-3. The instructions can be accessible by one or more data processing devices from a memory apparatus (e.g. RAM, ROM, virtual memory, hard drive memory, etc) or the like. Accordingly, embodiments of computer readable medium (e.g., non-transitory computer readable medium) in accordance with the present invention can include any storage medium that has imaged thereon a computer program (i.e., instructions) adapted for carrying out camera presence dependent image display functionality in accordance with the present invention. In a preferred embodiment, one or more control modules, controllers, and/or computers of a towing vehicle comprises the memory from which camera presence dependent image display functionality instructions are accessible and comprises one or more data processing devices that access and carry out such instructions. As such, it is disclosed herein that camera presence dependent image display functionality in accordance with the present invention is not unnecessarily limited to being implement in any particular module, computer, or other component of a vehicle.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An image display system, comprising:
a camera presence detector for detecting presence of a rear-view camera mounted on a towed unit connected to a towing vehicle;
an image display format controller coupled to the camera presence detector, the image display format controller enables a first display mode when the camera presence detector detects that the towed unit has a rear-view camera mounted thereon and enables a second display mode when the camera presence either detector fails to detect that the towed unit has a rear-view camera mounted thereon;
an image display apparatus coupled to the image display format controller, the image display apparatus includes a towed unit rear-view camera input, a towing vehicle rear-view camera input, a viewing substrate having a front surface and a rear surface, and an image output device underlying a central portion of the viewing substrate at the rear surface, the image output device includes an image output surface on which a viewable image is outputted, the viewable image from the rear-view camera on the towed unit is output by the image output device and displayed at the central portion of the viewing substrate, up to a maximum image output area, when the image display format controller enables the image display apparatus to be in the first display mode, the maximum image output area of the image output surface defines perimeter edges of the central portion of the viewing substrate;
the image output device outputs over the maximum image output area of the image output surface the viewable image corresponding to a signal provided at the towed unit rear-view camera input when the image display format controller causes the image display apparatus to be in the first display mode and the camera input selector is selecting the towed unit rear-view camera input;

the image output device outputs over a partial area of the image output surface an image corresponding to a signal provided by the towed unit rear-view camera input when the image display format controller causes the image display apparatus to be in the second display mode and the camera input selector is selecting the towing vehicle rear-view camera input; and an area of the central portion surrounding the partial area of the image output surface provides reflected rear-view imaging utility when the image display format controller causes the image display apparatus to be in the second display mode and the image provided by the towing vehicle rear-view camera is selected for being displayed.

2. The image display system of claim 1 wherein:
a rear-view mirror assembly comprises the image display apparatus; and
the central portion of the viewing substrate provides reflected roar-view imaging utility when the image display format controller causes the image display apparatus to be in the second display mode.

3. The image display system of claim 1 wherein a rear-view mirror assembly comprises the camera presence detector, the image display format controller, and the image display apparatus.

4. The image display system of claim 1 wherein:
the image display apparatus is coupled to the towed unit rear-view camera when the towed unit rear-view camera is detected;
the image output device includes an image output surface on which the viewable image is outputted;
a maximum image output area of the image output surface defines perimeter edges of the central portion of the viewing substrate; and
the image output device outputs over the maximum image output area of the image output surface an image corresponding to a signal provided by the towed unit rear-view camera when the image display format controller causes the image display apparatus to be in the first display mode.

5. The image display system of claim wherein:
the image output device includes an image output surface on which the viewable image is outputted;
a maximum image output area of the image output surface defines perimeter edges of the central portion of the viewing substrate;
the image display apparatus is coupled to the towed unit rear-view camera and to a rear-view camera mounted on the towing vehicle when the towed unit rear-view camera is detected;
the image output device outputs over the maximum image output area of the image output surface an image corresponding to a signal provided, by the towed unit rear-view camera when the image display format controller causes the image display apparatus to be in the first display mode and the image provided by the towed unit rear-view camera is selected for being displayed; and
the image output device outputs over the maximum image output area of the image output surface an image corresponding to a signal provided by the towing vehicle rear-view camera when the image display format controller causes the image display apparatus to be in the first display mode and the image provided by the towing vehicle rear-view camera is selected for being displayed.

6. The image display system of claim 5 wherein:
the image output device outputs over a partial area of the image output surface an image corresponding to a signal provided by the towing vehicle rear-view camera when the image display format controller causes the image display apparatus to be in the second display mode and the image provided by the towing vehicle rear-view camera is selected for being displayed; and
an area of the central portion surrounding the partial area of the image output surface provides reflected rear-view imaging utility when the image display format controller causes the image display apparatus to he in the second display mode and the imago provided by the towing vehicle rear-view camera is selected for being displayed.

7. The image display system of claim 6 wherein the partial area of the image output surface is positioned adjacent to one of a left-side edge and a right-side edge of the image output surface.

8. The image display system of claim 1 wherein the partial area of the image output surface is positioned adjacent to one of a left-side edge and a right-side edge of the image output surface.

9. A method, comprising:
monitoring a camera detection signal interface for detecting presence of a rear-view camera mounted on a towed unit connected to a towing vehicle;
enabling an image output device of an image display apparatus of the towing vehicle to output over at maximum image output area of an image output surface thereof an image captured by the towed unit rear-view camera coupled to the image output device in response to detecting that the towed unit rear-view camera is present and that the image provided by the towed unit rear-view camera is selected for being displayed, the image output device underlies a central portion of as rear surface of a viewing substrate of the image display apparatus, the maximum image output area of the image output surface defines perimeter edges of the central portion of the viewing substrate, and the viewing substrate is configured for enabling the image captured by the towed unit rear-view camera to be viewable while the image is being outputted by the image output device;
inhibiting the image captured by the towing vehicle rear-view camera from being outputted over the maximum image output area of the image output surface in response to failing to detect that the towed unit rear-view camera is present; and
enabling the image output device to output over the maximum image output area of the image output surface thereof an image captured by a rear-view camera mounted on the towing vehicle in response to determining that the towing vehicle rear-view camera is present and that the image provided by the towing vehicle rear-view camera is selected for being displayed.

10. The method of claim 9 wherein a rear-view mirror of the towing vehicle comprises the image display apparatus.

11. The method of claim 10, further comprising:
enabling the image output device to output over the maximum image output area of the image output surface thereof an image captured by a rear-view camera mounted on the towing vehicle in response to detecting that the towed unit rear-view camera, is present and that the image provided by the towing vehicle rear-view camera is selected for being displayed.

12. The method of claim 11, further comprising:
enabling the image output device to output over a partial area of the image output surface the image captured by the towing vehicle rear-view camera in response to failing to detect that the towed unit rear-view camera is present, an area of the central portion surrounding the partial area of the image output surface provides reflected rear-view imaging utility when the image output device is outputting the image captured by the towing vehicle rear-view camera over the partial area of the image output surface.

13. The method of claim 12 wherein the partial area of the image output surface is positioned adjacent to one of a left-side edge and a right-side edge of the image output surface.

* * * * *